United States Patent

Kammermeyer et al.

[15] 3,665,678
[45] May 30, 1972

[54] METHOD OF RECOVERING CARBON DIOXIDE FROM A FLUID

[72] Inventors: Karl Kammermeyer; Blase J. Sollami, both of Davenport, Iowa

[73] Assignee: The Bendix Corporation

[22] Filed: Sept. 14, 1970

[21] Appl. No.: 71,812

[52] U.S. Cl. ..............................55/68, 55/84, 260/448.2 R
[51] Int. Cl. ......................................B01d 53/16, C07f 7/02
[58] Field of Search........................55/16, 48, 68, 73, 84, 89, 55/158, 228; 252/49.6; 260/448.2 R

[56] References Cited

UNITED STATES PATENTS 2,966,235   12/1960   Kammermeyer ..........................55/16

*Primary Examiner*—Charles N. Hart
*Attorney*—William N. Antonis and Plante, Hartz, Smith and Thompson

[57] ABSTRACT

A method of recovering carbon dioxide from a gaseous fluid containing carbon dioxide and other gases mutually inert to each other. The gaseous fluid is passed through silicone oils in an absorption chamber at ambient or lower temperatures where the carbon dioxide is absorbed by the silicone oils. The silicone oils, laden with carbon dioxide, is then circulated through a series of coils in contact with a heat generating apparatus. After heat from the apparatus has been picked up, the silicone oils are then transported to a desorption chamber. In the desorption chamber the silicone oils laden with carbon dioxide is agitated and further heated. This agitation and heating along with a vacuum applied to the surface of the silicone oils in the desorption chamber causes the carbon dioxide to be given off as a gas. This gaseous carbon dioxide is transported to a storage chamber through a conduit surrounded by cooling coils. The silicone oils are then recirculated by a pump through a conduit surrounded by cooling coils where the temperature of the silicone oils is again brought back to ambient or lower temperature before it again passes through the absorption chamber where the mixture of the silicone oils and carbon dioxide takes place.

10 Claims, 1 Drawing Figure

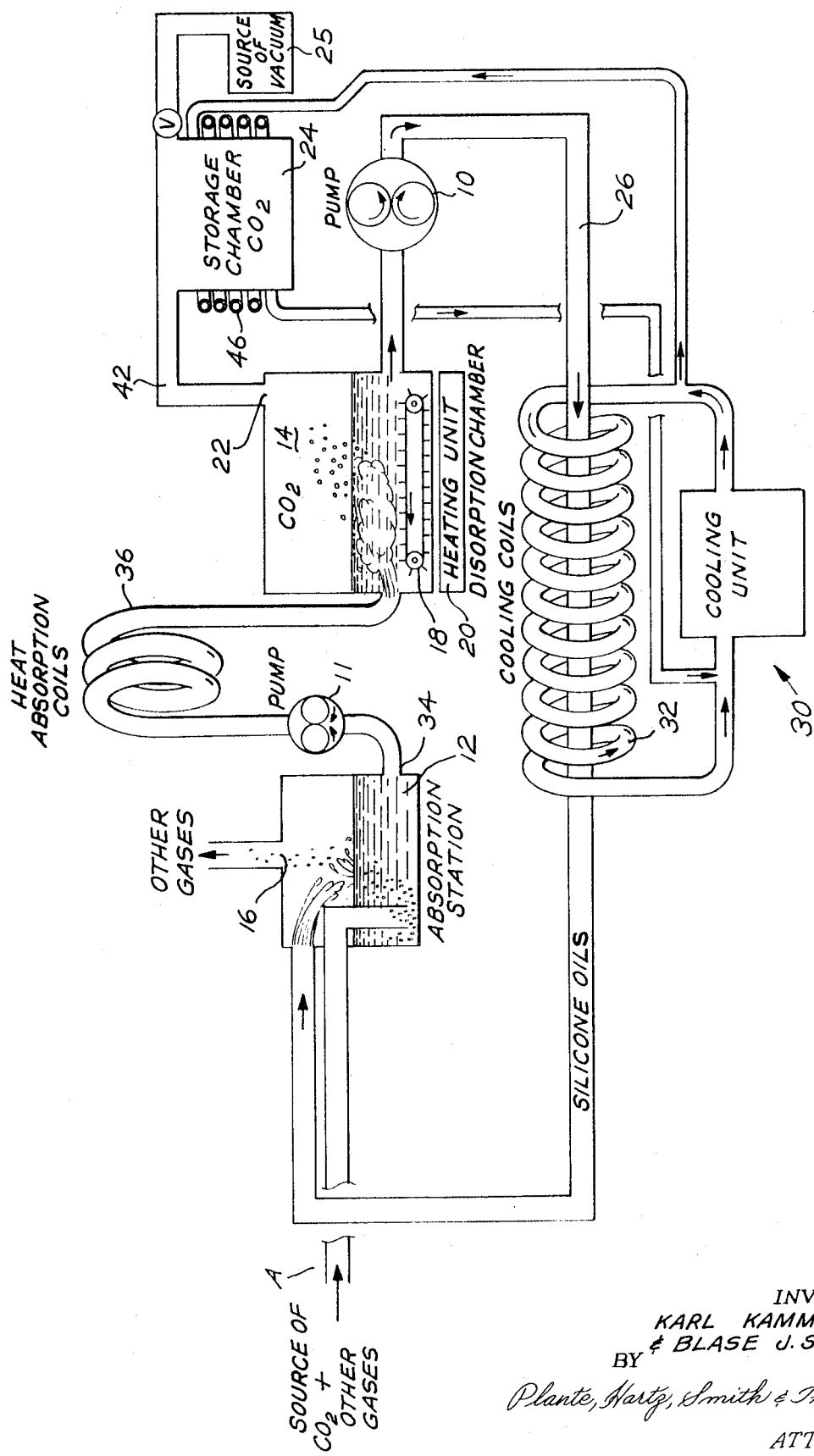

METHOD OF RECOVERING CARBON DIOXIDE FROM A FLUID

BACKGROUND OF THE INVENTION

Numerous methods have been proposed for the removal and recovery of carbon dioxide from industrial wastes, mine gases, from air and from human respiration. The latter problem has become of increased importance from the point of view of man's space life where it is imperative in the design of a closed breathing system. In manned space vehicles, carbon dioxide exhaled by the occupants of the vehicle must be removed from the cabin air in order to maintain the concentration of carbon dioxide at a low safe level. Upon removal, the carbon dioxide is concentrated so that it may be either disposed of or further processed for conversion into dry ice.

In industry, carbon dioxide is produced in fermentation processes, in the manufacture of lime and cement, the combustion of fossil fuels and natural gas. This carbon dioxide is recovered by adsorption in alkaline solutions including alkylol amines. Where amines are used, it is possible a material that will be highly corrosive material will be produced, thereby necessitating careful handling and storage of the amine solution.

SUMMARY OF THE INVENTION

Although it is generally known that silicone oils are very good lubricants in mechanical fluid devices, their solubility for carbon dioxide should make them suitable as a carbon dioxide absorber. When silicone oils are maintained at a low temperature, room or below, they will absorb the carbon dioxide and later give off the same carbon dioxide at a higher temperature and/or lower pressure. This is a completely reversible reaction as far as the silicone oils are concerned. Most silicone oils are quite stable, nonreactive and experience no decomposition or chemical changes in either the absorption or the desorption process. Due to the fact that the silicone oils are liquid, they can be continually moved back and forth from the absorption zone to the desorption zone and back and forth again through a simple pump mechanism. This permits the use of a simple pump system which is easily controlled thus, eliminating the need for several different beds of carbon dioxide regeneration devices which are normally used in a carbon dioxide converter device.

It is therefore an object of the invention to provide a method of recovering carbon dioxide with silicone oils, through an absorption and a desorption process.

A further object of the invention is to provide a method whereby carbon dioxide carried by a gaseous fluid is absorbed into the silicone oils at a predetermined temperature, at or below room temperature, and later released in a desorption chamber when the silicone oils are heated and agitated.

These and other objects become readily apparent from the following description of the invention.

BRIEF DESCRIPTION OF THE DRAWING

The single FIGURE shows schematically a method whereby carbon dioxide is absorbed into silicone oils in an absorption chamber and carried by the silicone oils to a desorption chamber where carbon dioxide is released as a gas.

DETAILED DESCRIPTION OF THE INVENTION

In the arrangement shown in the drawing, silicone oils blended from a group of linear dimethyl silicone polymers having the general formula:

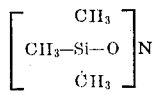

are circulated by a pump mechanism 11 from an absorption chamber 12 to a desorption chamber 14 and by pump mechanism 10 back again to the absorption chamber 12 in a continuous cycle. In the absorption chamber 12, carbon dioxide and other gases are passed through the stream of silicone oils. As the carbon dioxide comes in contact with the silicone oils, it is absorbed into the silicone oils while the other gases are readily passed out from the absorption chamber 12 through port 16 as free gases. The silicone oils are now circulated from the absorption chamber 12 to the desorption chamber 14. In the desorption chamber 14 the silicone oils laden with carbon dioxide is agitated by a stirring mechanism 18 and heat is applied by the heating unit 20. Simultaneous, to applying heat and agitation, a vacuum, from a source of vacuum 25, is applied across the surface of the fluid in the absorption chamber. Either vacuum or heat will loosen the bond between the carbon dioxide absorbed by the silicone oils. The carbon dioxide is given up as a gas and passed through an outlet 22 to a chamber 24. The temperature of the carbon dioxide in the chamber 24 is then reduced to ambient or lower through coil 46 connected to cooling unit 30 for ease of storage and handling.

After the carbon dioxide has been released from the silicone oils, the silicone oils are again moved by pump 10 through conduit 26 to the absorption chamber 12. In returning to the absorption chamber 12 the silicone oils are brought through a cooling unit 30 to reduce the temperature of the silicone oils back to ambient temperature or lower before it enters the inlet 28 in the absorption chamber 12.

The cooling unit 30 or heat exchanger consists of several coils of tubing 32 wrapped around the return conduit 26 which returns the silicone oils to the absorption chamber 12.

The release of carbon dioxide from the desorption chamber can be accomplished by several different variations of the recovery process. For example, the heat from the operating mechanism can be absorbed in coils 36 and can be added to the heat from heating unit 20. This alone will drive off the carbon dioxide from the silicone oils. Alternatively, both heat and vacuum can be applied to the silicone oils laden with carbon dioxide with the vacuum being applied to the surface of the fluid in the desorption chamber. Vacuum alone will have the tendency to extract the carbon dioxide from the silicone oils. By increasing the heat and vacuum, while agitating the fluid, it is possible to release the carbon dioxide from the silicone oils in the least amount of time, since more molecules of carbon dioxide laden silicone oils will reach the surface to be acted on by the vacuum.

During the whole process the silicone oils are completely inert and act a as a medium for carrying the carbon dioxide from the absorption chamber 12 to the desorption chamber 14.

Although the body can sustain life with a small amount of carbon dioxide in the air, as the percentage of carbon dioxide rises, mental attitude and alertness decrease. The mechanism shown will remove the amount of carbon dioxide produced by an individual in exhaling air through a breathing apparatus (not shown). When a person exhales, carbon dioxide is given up from his body and is carried by the exhaled air to an absorption chamber 12 where it is bubbled through the stream of silicone oils. Since the silicone oils have an affinity for carbon dioxide, the air which passes through outlet 16 for return to the breathing apparatus of the individual is stripped of carbon dioxide. Thus, the quality of air returned to the breathing system will be capable of maintaining a high physiological level for a recipient.

Silicone oils are chemically and physically inert under these operating conditions and noncorrosive toward ordinary materials. The silicone oils are non-poisonous, non-irritating and should not cause deterioration to a lubricant if it happens to leak from a system. Thus, it will be apparent that this system, which will recover carbon dioxide, could be put to many different uses both in industrial and for human environment such as the recovery of carbon dioxide from waste in air pollution.

We claim:
1. A method of recovering carbon dioxide from a gaseous fluid which includes carbon dioxide and other gases mutually inert to each other, comprising the steps of:
  passing said gaseous fluid through silicone oils at a predetermined temperature, said silicone oils absorbing the carbon dioxide from said gaseous fluid upon contact while permitting said other gases to flow to an outlet;
  circulating said silicone oils now laden with carbon dioxide to a desorption chamber;
  varying the temperature and pressure in said desorption chamber to cause said carbon dioxide carried by said silicone oils to be released as a gas; and
  transporting said carbon dioxide gas from said desorption chamber to a storage chamber.

2. The method of recovering carbon dioxide, as recited in claim 1, including the steps of:
  agitating said silicone oils in said desorption chamber so as to permit a greater amount of the silicone oils to be exposed to said varying pressure.

3. The method of recovering carbon dioxide, as recited in claim 2 wherein the temperature is raised in the desorption chamber.

4. The method of recovering carbon dioxide, as recited in claim 3, wherein the pressure in the desorption chamber is lowered.

5. The method of recovering carbon dioxide, as recited in claim 2, wherein the temperature in the desorption chamber is raised and the pressure is lowered causing said carbon dioxide to be released.

6. The method of recovering carbon dioxide, as recited in claim 2, including the steps of:
  removing the silicone oils from said desorption chamber; and
  cooling said silicone oils in a conduit in order that said silicone oils will be below ambient temperature upon reaching the location where said gaseous fluid is passed therethrough.

7. The method of recovering carbon dioxide, as recited in claim 2, wherein said step of varying the temperature includes:
  moving said silicone oils laden with carbon dioxide through a cooling unit where heat from an operating unit is removed to preheat said silicone oils.

8. The method of recovering carbon dioxide, as recited in claim 7, wherein said silicone oils are a blend of linear dimethyl silicone polymers having the formula:

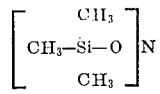

9. The method of recovering carbon dioxide, as recited in claim 2, including the step of:
  extracting said carbon dioxide from said silicone oils by applying a vacuum to the desorption chamber above the surface of said silicone oils.

10. The method of recovering carbon dioxide, as recited in claim 9 wherein said silicone oils are a blend of linear dimethyl silicone polymers having the formula:

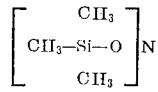

* * * * *